United States Patent
Chen

(10) Patent No.: US 7,355,958 B2
(45) Date of Patent: Apr. 8, 2008

(54) BLIND OFDM CHANNEL ESTIMATION AND IDENTIFICATION USING RECEIVER DIVERSITY

(75) Inventor: Biao Chen, Jamesville, NY (US)

(73) Assignee: Syracuse University, Syracuse, NY (US)

( * ) Notice: Subject to any disclaimer, the term of this patent is extended or adjusted under 35 U.S.C. 154(b) by 1038 days.

(21) Appl. No.: 10/277,417

(22) Filed: Oct. 22, 2002

(65) Prior Publication Data

US 2004/0076112 A1    Apr. 22, 2004

(51) Int. Cl.
*H04J 11/00* (2006.01)
(52) U.S. Cl. .................. 370/203; 370/210; 375/260
(58) Field of Classification Search ............ None
See application file for complete search history.

(56) References Cited

U.S. PATENT DOCUMENTS

| | | | |
|---|---|---|---|
| 6,473,393 B1 * | 10/2002 | Ariyavisitakul et al. .... | 370/203 |
| 6,760,388 B2 * | 7/2004 | Ketchum et al. ........... | 375/295 |
| 7,020,490 B2 * | 3/2006 | Khatri ........................ | 455/561 |
| 2002/0181509 A1 * | 12/2002 | Mody et al. ................ | 370/480 |
| 2003/0185310 A1 * | 10/2003 | Ketchum et al. ........... | 375/259 |
| 2003/0189999 A1 * | 10/2003 | Kadous ....................... | 375/349 |
| 2003/0235255 A1 * | 12/2003 | Ketchum et al. ........... | 375/285 |

* cited by examiner

*Primary Examiner*—Bob A. Phunkulh
(74) *Attorney, Agent, or Firm*—Hiscock & Barclay, LLP

(57) ABSTRACT

A method for blindly determining a channel impulse response (CIR) for a channel in an orthogonal frequency division multiplexing (OFDM) communications system includes constructing a matrix from two received signals. A singular value decomposition is performed on the matrix, which produces left and right singular matrixes. The right singular vector corresponding to the smallest singular value of the matrix is found, which yields the channel impulse response multiplied by an unknown scalar constant. The unknown scalar constant is then removed used known techniques. The method is data efficient, independent of the input symbol constellation, computationally efficient, and superior in performance compared with prior art blind algorithms.

3 Claims, 5 Drawing Sheets

BLIND OFDM CHANNEL ESTIMATION AND IDENTIFICATION USING RECEIVER DIVERSITY

FIELD OF THE INVENTION

This invention relates generally to the field of orthogonal frequency division multiplexing (OFDM), and more particularly to a method for OFDM blind channel estimation and identification.

BACKGROUND OF THE INVENTION

Because of its resistance to multipath channel fading and its spectral efficiency, orthogonal frequency division multiplexing (OFDM) has attracted increasing interest in recent years as a suitable modulation scheme for broadband wireless communication systems, including digital broadcasting and wireless LAN applications. OFDM is a method of digital modulation in which a signal is split into several narrowband channels at different frequencies. In some respects, OFDM is similar to conventional frequency-division multiplexing (FDM). Frequency division multiplexing (FDM) is a technology that transmits multiple signals simultaneously over a single transmission path, such as a cable or wireless system. Each signal travels within its own unique frequency range (carrier), which is modulated by the data (text, voice, video, etc.).

Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion. Since multiple versions of the signal interfere with each other (inter symbol interference (ISI)) it becomes very hard to extract the original information. Thus, priority is given to minimizing the interference among the channels and the symbols that make up the data stream.

Some basic definitions for digital signals are in order. A "data block" or "block of symbols" is a packet which includes a specified number of symbols. For instance, the IEEE 802.11a protocol specifies that each data block consists of 64 symbols. Since a digital signal can be represented in a simple way using a complex number, the real and imaginary parts determine a point in the two dimensional plane. The manner in which the signals (points) are laid out in the plane is referred to as a "signal constellation." The number of points used for each particular modulation is the "constellation size" for that particular modulation.

OFDM is sometimes called multi-carrier or discrete multi-tone modulation. It is the modulation technique used for digital TV in Europe, Japan, and Australia. An OFDM signal is essentially a bundle of narrowband carriers transmitted in parallel at different frequencies from the same source; hence the phrase "multi-carrier" as opposed to "single carrier." The individual carriers are commonly called subcarriers, and it is these subcarriers that transmit information via a modulation scheme. Typically, either PSK (phase shift keying) or QAM (quadrature amplitude modulation) schemes are used. The subcarriers are individually low symbol rate, with enough spacing between the subcarriers so that they are non-interfering. The spacing is typically designed as the inverse of the symbol duration, so that each subcarrier is orthogonal.

The multipath transmissions of the data block are received at different times due to the unequal path lengths of each path. Each transmission has a start time and a finish time for the data block. The difference between the finish times is the "channel length." The "channel" is all the multiple paths that the signal with the data block actually takes. The signals from all the paths combine at the receiver to produce a distorted signal. The received signal is a convolution of the transmitted signal and the channel. The multipath signals can be modeled as $$x_1(t)=a_0 s(t)+a_1 s(t-T)+a_2 s(t-2T) \ldots$$

$$x_2(t)=b_0 s(t)+b_1 s(t-T)+b_2 s(t-2T) \ldots$$

In OFDM, the channel is converted from a convolution to a multiplication which can be expressed as $y_k = H_{(k)} d_k$ which stands for $y_1 = H_{(1)} d_1$, $y_2 = H_{(2)} d_2$, ..., where $y_k$ is a product between $d_k$ and $H_{(k)}$, where $H_{(k)}$ is the channel transfer function.

The cyclic prefix is a common feature of OFDM schemes which is used to combat ISI (inter symbol interference) and ICI (inter channel interference), which are introduced by the multipath channel that the signal takes between the transmitter and receiver. Cyclic prefix is the replication of part of the OFDM time-domain waveform to create a guard period. This part of the signal is added on by the transmitter and removed by the receiver. Once this is done, the signal model for the OFDM transmission over a multipath channel is simplified. The transmitted symbols at time slot l and subcarrier k are only disturbed by a factor $H_{l,k}$, which is the channel transfer function (the Fourier transform of the CIR (channel impulse response)) at the subcarrier frequency, as well as by additional white Gaussian noise n according to $$z_{l,k} = \alpha_{l,k} \cdot H_{l,k} + n$$

so that the influence of the channel is removed by dividing by $H_{l,k}$. For a coherent OFDM system, reliable estimation of the time dispersive channel is the key to achieving the desired performance gain.

One method, the training symbol based OFDM method, usually requires an extra +20% bandwidth, thereby consuming too much of the available limited bandwidth.

Another method, the existing blind OFDM channel estimation method, is statistical in nature (e.g., it is second order statistics based as disclosed in B. Muquet and M. de Courville, "Blind and semi-blind channel identification methods using second order statistics for OFDM systems," in Proc. International Conference on Acoustic Speech and Signal Processing, Phoenix, Ariz., March 1999, vol.5, pp. 2745-2748; X. Cai and A. N. Akansu, "A subspace method for blind channel identification in OFDM systems," in Proc. ICC 2000, New Brunswick, N.J., March 2000, vol.2, pp. 929-933; X. Zhuang, Z. Ding, and A. L. Swindlehurst, "A statistical subspace method for blind channel identification in OFDM communications," in Proc. 2000 International Conference on Acoustic Speech and Signal Processing, Istanbul, Turkey, June 2000, vol.5, pp. 2493-2496; and C. Li and S. Roy, "Subspace based blind channel estimation for OFDM by exploiting virtual carrier," in Proc. CLOBECOM'01, San Antonio, Tex., November 2001, vol.1, pp. 295-299), which usually requires a large number of data blocks. Furthermore, this method has limited application in wireless channels involving high mobility (i.e., a large Doppler spread) as the channel may vary from block to block. The blind channel estimation methods have the advantage of higher bandwidth efficiency as they do not require the transmission of training symbols. However, they have limited applicability in wireless channels involving high mobility (large Doppler spread) as the channel may vary from block to block.

Yet another method, the deterministic blind channel estimation method, is more data efficient. For example, the finite-alphabet based method explored in N. Chotikakamthorn and H. B. Suzuki, "On identifiability of OFDM blind channel estimation," in Proc. IEEE Vehicular Technology Conference, Amsterdam, Netherlands, September 1999 and S. Zhou and G. B. Giannakis, "Finite-alphabet based channel estimation for OFDM and related multicarrier systems," IEEE Trans. Communications, pp. 1402-1414, August 2001 can be implemented using only a single data block. However, the developed algorithm is mostly limited in practice to PSK modulation.

The decision directed iterative algorithm was proposed in N. Chotikakamthorn and H. B. Suzuki, referred to above, for joint symbol and channel estimation. The performance, however, largely depends on the initial point and is subject to the error propagation effect. The proposed identifiability also hinges heavily upon the signal constellation. For example, for 16 QAM, the number of subcarriers should be at least 52 times the channel length, therefore having limited applicability in practice. In S. Zhou and G. B. Giannakis, referred to above, the finite alphabet is explicitly exploited to obtain an estimate of $H^J(k)$ where $H(k)$ is the channel frequency response at subcarrier k and J is a number determined by the signal constellation. While estimation of $H^J(k)$ can be achieved using a single block for PSK modulation, multiple blocks are still required for QAM modulation along with some statistical assumptions on the input symbol. Further, to resolve the phase ambiguity in obtaining $H(k)$ from $H^J(k)$, the optimal minimum distance algorithm of S. Zhou and G. B. Giannakis requires a search of $J^N$ possible channels, which is usually prohibitive. Here J=4 for QAM modulation and J equals the constellation size for PSK modulation, while N is the number of subcarriers. Even the suboptimal phased directed algorithm can have substantial complexity for moderate to long channel lengths and is sensitive to the initial starting point of the iteration.

Receiver diversity is another important resource that can be exploited in OFDM channel estimation. As disclosed in H. Ali, J. H. Manton, and Y. Hua, "A SOS subspace method for blind channel identification and equalization in bandwidth efficient OFDM systems based on receive antenna diversity," in Proc.11th IEEE Signal Processing Workshop on Statistical Signal Processing, Singapore, August 2001, pp. 401-404 and C. Li and S. Roy, "A subspace blind channel estimation method for OFDM systems without cyclic prefix," in Proc. VTC'01 Fall, Atlantic City, N.J., October 2001, vol.4, pp. 2148-2152, multiple receive antennas are used for channel estimation for OFDM systems without cyclic prefix (CP).

SUMMARY OF THE INVENTION

Briefly stated, a method for blindly determining a channel impulse response (CIR) for a channel in an orthogonal frequency division multiplexing (OFDM) communications system includes constructing a matrix from two received signals. A singular value decomposition is performed on the matrix, which produces left and right singular matrixes. The right singular vector corresponding to the smallest singular value of the matrix is found, which yields the channel impulse response multiplied by an unknown scalar constant. The unknown scalar constant is then removed used known techniques. The method is data efficient, independent of the input symbol constellation, computationally efficient, and superior in performance compared with prior art blind algorithms.

According to an embodiment of the invention, a method for blindly determining a channel impulse response for a channel in an orthogonal frequency division multiplexing (OFDM) communications system includes the steps of (a) providing at least first and second receive antennas which produce at least first and second OFDM received signals from a single OFDM signal transmitted over the channel; and (b) processing the first received signal and the second received signal to determine the channel impulse response for the channel, thereby permitting recovery of the signal transmitted OFDM signal; wherein the step of processing includes (i) constructing a constructed matrix from the at least first and second received signals; (ii) performing a singular value decomposition on the constructed matrix to produce a left singular matrix and a right singular matrix; (iii) finding a right singular vector corresponding to a smallest singular value of the constructed matrix, thereby yielding the channel impulse response multiplied by an unknown scalar constant; and (iv) removing the unknown scalar constant, thereby yielding the channel impulse response.

According to an embodiment of the invention, a program storage device readable by a machine tangibly embodies a program of instructions executable by a machine to perform method steps blindly determining a channel impulse response for a channel in an orthogonal frequency division multiplexing (OFDM) communications system, wherein the method steps includes (a) processing at least first and second OFDM received signals from a single OFDM signal transmitted over the channel, wherein the at least first and second OFDM received signals are produced from at least first and second receive antennas, respectively; and (b) processing the first received signal and the second received signal to determine the channel impulse response for the channel, thereby permitting recovery of the signal transmitted OFDM signal; wherein the step of processing includes (1) constructing a constructed matrix from the at least first and second received signals; (2) performing a singular value decomposition on the constructed matrix to produce a left singular matrix and a right singular matrix; (3) finding a right singular vector corresponding to a smallest singular value of the constructed matrix, thereby yielding the channel impulse response multiplied by an unknown scalar constant; and (4) removing the unknown scalar constant, thereby yielding the channel impulse response.

According to an embodiment of the invention, a system for blindly determining a channel impulse response for a channel in an orthogonal frequency division multiplexing (OFDM) communications system includes means for providing at least first and second receive antennas which produce at least first and second OFDM received signals from a single OFDM signal transmitted over the channel; and means for processing the first received signal and the second received signal to determine the channel impulse response for the channel, thereby permitting recovery of the signal transmitted OFDM signal.

DETAILED DESCRIPTION OF THE PREFERRED EMBODIMENT

The following notations are used in this disclosure. The DFT (discrete time Fourier transform) matrix W, known in OFDM systems, can be partitioned as $$W = [W_L | W_{N-L}] \quad (1)$$

where L is the length of channel impulse response which is assumed known a priori in this disclosure, $W_L$ is the matrix composed of the first L columns of W, and $W_{N-L}$ contains the remaining N-L columns. W is known beforehand and is independent of the signal. Further we can write $$W_L = \begin{bmatrix} u_1^H \\ \vdots \\ u_N^H \end{bmatrix} \quad (2)$$

where each $u_k$ is an L by 1 vector. We use bold face capital letters to denote matrices while bold face small letters denote vectors. The disclosure herein assumes a background in digital communications and linear algebra.

We now introduce the signal model with receiver diversity. In OFDM (Orthogonal Frequency Division Multiplexing) systems, N subcarriers are used to modulate information symbols (i.e., the digital signal that carries useful information) to construct one OFDM symbol. Specifically, each of the N symbols is used to modulate a subcarrier, and the N modulated subcarriers are added together to form an OFDM symbol. Orthogonality among subcarriers is achieved by carefully selecting carrier frequencies such that each OFDM symbol interval contains an integer number of periods for all subcarriers. Using a discrete-time baseband signal model, one of the most commonly used schemes is the IDFT-DFT (inverse discrete-time Fourier transform—discrete-time Fourier transform) based OFDM system. Guard time, which is cyclically extended (cyclic prefix) to maintain inter-carrier orthogonality in the presence of a time-dispersive channel, is inserted which is assumed to be longer than the maximum delay spread of the channel to totally eliminate inter-block interference, as explained in R. van Nee and R. Prasad, *OFDM For Multimedia Wireless Communications*, Artech House, Boston, Mass., 2000.

Figure 1:
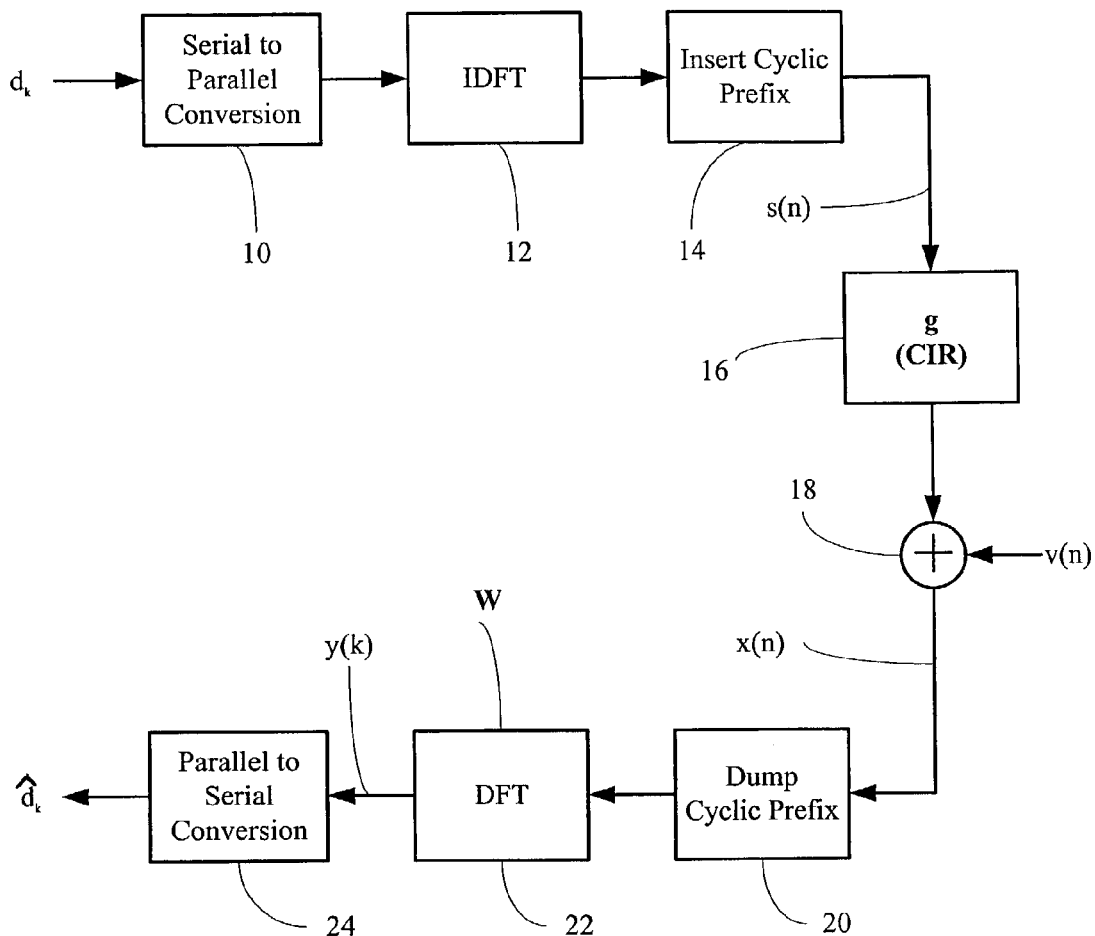
FIG. 1 shows a discrete-time baseband model of OFDM systems.

Referring to FIG. 1, the discrete-time complex baseband OFDM signal is written as $$s(n) = \frac{1}{\sqrt{N}} \sum_{k=0}^{N-1} d_k e^{j2\pi \frac{kn}{N}}$$

where each $d_k$ is used to modulate the subcarrier $e^{j2\pi k/N}$. The $d_k$'s are converted from serial to parallel in block 10, the inverse discrete-time Fourier transform (IDFT) is performed in block 12, and then the cyclic prefix is added in block 14. The signal s(n) is transmitted over the channel, whose channel impulse response (CIR) is shown in block 16 with additive noise added in summer 18. The received signal is indicated by x(n). The cyclic prefix is dumped in block 20 before the discrete-time Fourier transform (DFT) is performed in block 22, which produces the signal y(k). After parallel to serial conversion, $\hat{d}_k$ is obtained.

Receiver diversity for OFDM systems can be achieved either by employing multiple receiver antennas or via oversampling. We assume that the same signal is sent and received by two different receivers. Hence, they undergo different channels. In both cases, the discrete-time baseband received signals can be written as $$x_1(n) = \frac{1}{\sqrt{N}} \sum_{k=0}^{N-1} H_1(k) d_k e^{j\frac{2\pi kn}{N}} + v_1(n)$$

$$x_2(n) = \frac{1}{\sqrt{N}} \sum_{k=0}^{N-1} H_2(k) d_k e^{j\frac{2\pi kn}{N}} + v_2(n)$$

where $H_i(k)$ is the channel frequency response corresponding to $i^{th}$ channel at subcarrier k, and $v_1(n)$ and $v_2(n)$ are both additive white complex Gaussian noise which are uncorrelated with each other. The above signal model can be written in a compact matrix form as $$x_1 = W^H H_1 d + v_1$$

$$x_2 = W^H H_2 d + v_2$$

where W is the DFT matrix as in equation (1), $H_i = \text{diag}(h_i)$ with $$h_i = [H_i(0), \ldots, H_i(N-1)]^T \quad (3)$$

That is, $H_i$ is a diagonal matrix with diagonal element $H_i(k)$; and $d = [d_0, \ldots, d_{N-1}]^T$ is the symbol vector. Taking the DFT at the receiver, we have the equivalent frequency domain observation expressed as $$y_1 = Wx_1 = H_1 d + z_1$$

$$y_2 = Wx_2 = H_2 d + z_2$$

where $z_1$ and $z_2$ are statistically identical to $v_1$ and $v_2$ because of the unitary property of W, i.e., $z_1$ and $z_2$ are both white complex Gaussian which are uncorrelated with each other.

Figure 2:
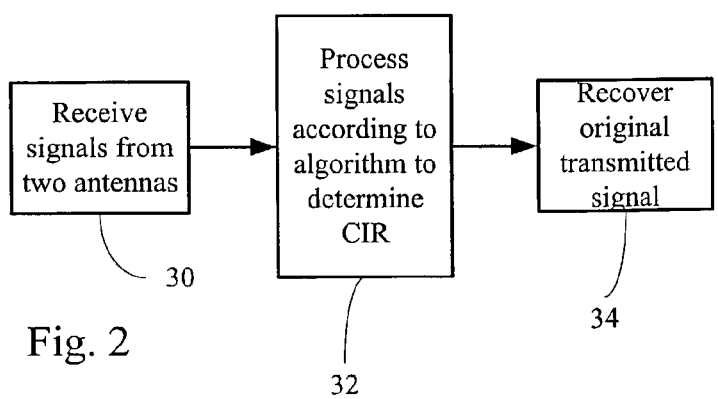
FIG. 2 shows the steps of the method of the present invention.

Blind channel estimation aims to retrieve both $H_1$ and $H_2$ without any knowledge about d. That is, we know $y_1$ and $y_2$, but we don't know $H_1$ or $H_2$ but we do know that d is the same in each equation. Clearly, a direct approach to estimate the frequency response matrix $H_i$ is not feasible, because the number of unknowns (6N from the three N×1 complex vectors $h_1$, $h_2$, and d) exceeds the number of observations (4N from the two observation vectors $y_1$ and $y_2$). However, we note that the actual degrees of freedom associated with $H_1$ and $H_2$ are far smaller than N, the OFDM symbol length. This is because the frequency response is simply the DFT of the channel impulse response, which is usually assumed to be shorter than the length of the cyclic prefix, and hence is far smaller than N. With this observation, we an rewrite the signal model as $$y_1 = Dh_1 + z_1 = DW_L g_1 + z_1$$

$$y_2 = Dh_2 + z_2 = DW_L g_2 + z_2 \quad (4)$$

where D=diag(d), i.e., the diagonal matrix with diagonal element $d_k$, $h_i$ is as defined in equation (3), and $g_i$ is the channel impulse response (CIR) for the $i^{th}$ channel and is of length L. Here the total number of unknowns is 2×(N+2 L) which is smaller than the number of observations, 4N. Again, we note here that in this disclosure we deal exclusively with the case of a known channel length L. What we are doing is estimating g because we have enough observations to solve for g by reducing the number of unknowns from 6N to 2×(N+2 L). Because of the relationship between g and H, i.e., H is the DFT of g, and g is the CIR, once we know g we know H. The method of the invention is shown is shown generally in FIG. 2. Signals are received from two receive antennas in block 30, after which the signals are processed in block 32 according to the algorithm presented herein to determine the CIR. The CIR is then used to recover the original transmitted signal in block 34.

There are two cases with which we have to deal when doing blind channel estimation: the noiseless case and the noisy case.

Noiseless Case

Given the signal model in equation (4), we first consider the channel estimation in the noiseless case. We emphasize again that by converting the channel estimation from the frequency domain to the time domain, we have reduced the degrees of freedom. Using the above model, we now devise a simple algorithm that can perfectly retrieve the time domain channel in the absence of noise.

Without channel noise, equation (4) can be written, in an element by element fashion, as $$y_1(k) = d_k \cdot u_k^H g_1$$

$$y_2(k) = d_k \cdot u_k^H g_2$$

where $u_k^H$ is given in equation (2). Therefore, for $d_k \neq 0$, $$y_1(k) u_k^H g_2 = y_2(k) u_k^H g_1$$

The matrix form of the above equation is $$Y_1 W_L g_2 = Y_2 W_L g_1$$

where $Y_1$=diag($y_1$) and $Y_2$=diag($y_2$). Equivalently, we have $$[Y_2 W_L | -Y_1 W_L] \begin{bmatrix} g_1 \\ g_2 \end{bmatrix} = 0 \quad (5)$$

Therefore, in the noiseless case, the channel can be retrieved up to a scalar ambiguity by simply finding a solution for the above homogeneous equation. We will address the uniqueness of the solution to equation (5) (also known as the "identifiability" issue) later in this disclosure. Equivalently, the above equation can be expressed in a quadratic form: $g^H V^H V_g = 0$ where $g = [g_1, g_2]^T$ and $V = [Y_2 W_L | -Y_1 W_L]$. This allows the easy extension to the noisy case where instead of finding the exact solution we simply try to minimize the quadratic term under, for example, a unit norm constraint. The solution is the eigenvector corresponding to the smallest eigenvalue of the matrix $V^H V$, which is equivalent to finding the right singular vector corresponding to the smallest singular value of V.

Noisy Case

In the presence of channel noise, it is clear that equation (5) will not hold. Instead of finding the exact solution, we may instead find the "right singular vector" corresponding to the smallest singular value of the matrix:

$$V = [Y_2 W_L | -Y_1 W_L]. \quad (6)$$

where $Y_2$ is the received signal from the second antenna, $Y_1$ is the received signal from the first antenna, and $W_L$ is part of the DFT matrix. Equivalently, we may seek to minimize the quadratic form:

$$\min_g g^H U g = g^H V^H V g$$

where $g = [g_1 g_2]^T$ and $U = V^H V$ is a 2 L×2 L matrix which is Hermitian and positive definite. This minimization can be achieved by simply finding the eigenvector corresponding to the smallest eigenvalue of U.

Most subspace methods require multiple data blocks for them to work. The method of the present invention works with a single data block, yet can be easily extended to multiple data blocks for enhanced performance. Two heuristic approaches can be adopted. The first approach is to do a channel estimation using each block and then average over the data blocks to smooth out the error. Another approach is to first average over the V matrix for each block (or equivalently, average over the observations $y_1$ and $y_2$), i.e., calculate the V matrix for each block and then use the average in equation (6). The second approach is advantageous from the computational point of view in that it involves only a single singular value decomposition (SVD) no matter how many data blocks are used. Performance wise, we also find that the latter approach yields a much smaller error. This can be explained as following. Averaging over V allows the smoothing before the SVD, which tends to better smooth out the random channel noise than averaging after SVD.

If the channel response is quasi-stationary when we can assume that it remains constant during several OFDM blocks, channel estimation can be improved by utilizing multiple OFDM blocks. Assume blocks are used for channel estimation, it is straightforward to extend the algorithm to the following minimization problem:

$$\min_g g^H \left[\sum_{k=1}^{K} V_k^H V_k\right] g \, s.t. |g| = 1$$

where $V_k$ is constructed for each OFDM block. Notice that this extension does not have any substantial increase in complexity; only one eigen-decomposition is required no matter how many blocks are used.

We now discuss the identifiability issues based on the signal model of equation (4). The channels are said to be identifiable if, in the absence of noise, there is a unique solution (up to a scalar ambiguity) that satisfies the signal model of equation (4). In particular, we propose a sufficient condition and a necessary condition (although not a "sufficient and necessary" condition) for channel identifiability using receiver diversity.

Theorem 1 (sufficient condition): The channel impulse responses $g_1$ and $g_2$ can be identified up to a scalar factor if
1. $H_1(z)$ and $H_2(z)$ do not share common zeros, and
2. $N \geq 2L-1$.

Proof: In the noiseless case, the model from equation (4) becomes $$y_1 = DW_L g_1$$

$$y_2 = DW_L g_2$$

Using the notation $u_k^H$ as in equation (2), we have $$d_k \cdot u_k^H g_1 = d_k \cdot u_k^H g_1$$

$$d_k \cdot u_k^H g_2 = d_k \cdot u_k^H g_2$$

Assume we have another set of channel responses $\tilde{g}_1$ and $\tilde{g}_2$ that also satisfy the system model, then $$y_1(k) = \tilde{d}_k \cdot u_k^H \tilde{g}_1$$

$$y_2(k) = \tilde{d}_k \cdot u_k^H \tilde{g}_2$$

Clearly $$d_k \cdot u_k^H g_1 = \tilde{d}_k \cdot u_k^H \tilde{g}_1$$

$$d_k \cdot u_k^H g_2 = \tilde{d}_k \cdot u_k^H \tilde{g}_2$$

From this we get, through cross multiplication, $$d_k \tilde{d}_k (u_k^H g_1)(u_k^H \tilde{g}_2) = d_k \tilde{d}_k (u_k^H g_1)(u_k^H \tilde{g}_1)$$

which is equivalent to $$H_1(k) \tilde{H}_2(k) = \tilde{H}_1(k) H_2(k)$$

for $k=0, \ldots, N-1$. Notice that $H_i(k)$ and $\tilde{H}_i(k)$ are respectively the N point DFT's at frequency $2\pi k/N$ for impulse responses $g_i$ and $\tilde{g}_i$. Correspondingly, we have in the time domain the following identity for N point circular convolution (with circular convolution denoted by "⊗" and linear convolution denoted by "*"):

$$g_1 \otimes \tilde{g}_2 = \tilde{g}_1 \otimes g_2$$

Given that $g_1, g_2, \tilde{g}_1, \tilde{g}_2$ are all vectors of length L, if $N \geq 2L-1$, then the N point circular convolution is equivalent to the linear convolution. Therefore $$g_1 * \tilde{g}_2 = \tilde{g}_1 * g_2$$

Or $$G_1(z) \tilde{G}_2(z) = \tilde{G}_1(z) G_2(z) \quad (7)$$

Given equation (7), it is shown in G. Xu, H. Liu, L. Tong, and T. Kailath, "A Least-Squares Approach to Blind Channel Identification," IEEE Trans. Signal Processing, vol. SP-43, no. 12, pp. 2982-2993, December 1995, that the channel can be identified up to a scalar factor if $G_1(z)$ and $G_2(z)$ do not share any common nulls. Therefore we must have $$\begin{bmatrix} g_1 \\ g_2 \end{bmatrix} = \alpha \begin{bmatrix} \tilde{g}_1 \\ \tilde{g}_2 \end{bmatrix} \quad \text{Q.E.D.}$$

Theorem 2 (necessary condition) If the channel impulse response $g_1$ and $g_2$ are identifiable up to a scalar factor, then $N \geq 2L-1$.

Proof: If the system is identifiable, there will be a unique (up to a scalar ambiguity) solution $g_1$ and $g_2$ for equation (5). Therefore the rank of V must be 2L-1, i.e., its null space must have a dimension equal to 1. Since V is an N by 2L matrix, we must have $N \geq 2L-1$. Q.E.D.

We now evaluate the performance of the blind estimation method of the present invention by deriving the Cramer-Rao Lower Bound (CRLB). The unknown parameter vector is $$\theta = [Re(g_1), Re(g_2), Re(d), Im(g_1), Im(g_2), Im(d)]^T$$

Based on equation (4), and given that $z_1$ and $z_1$ are uncorrelated with each other, the negative log likelihood function can be obtained, after discarding any irrelevant constants, as $$-\ln\Lambda = (y_1 - DW_L g_1)^H (y_1 - DW_L g_1) + (y_2 - DW_L g_2)^H (y_2 - DW_L g_2)$$

From this, the Fisher Information Matrix (FIM) can be derived as $$F = 2 \begin{bmatrix} Re(F_c) & -Im(F_c) \\ Im(F_c) & Re(F_c) \end{bmatrix} \quad (8)$$

where $$F_c = \frac{1}{\sigma^2} \begin{bmatrix} Q^H Q & 0 & Q^H H_1 \\ 0 & Q^H Q & Q^H H_2 \\ H_1^H Q & H_2^H Q & H_1^H H_1 + H_2^H H_2 \end{bmatrix},$$

$\sigma^2$ is the noise power, and $Q = DW_L$. A detailed derivation of the FIM follows.

Considering the signal model as in equation (4), the unknown parameter vector is $$\theta = [Re(g_1), Re(g_2), Re(d), Im(g_1), Im(g_2), Im(d)]^T$$

Apparently the FIM, denoted by F, is of dimension 2N+4L by 2N+4L. Define $$\mu = \begin{bmatrix} DW_L g_1 \\ DW_L g_2 \end{bmatrix}$$

to be the mean value of the observation vector $[y_1, y_2]^T$ that is otherwise Gaussian distributed. Given that the noise covariance matrix is $\sigma^2 I$, each element of the FIM can be written as $$F(i, j) = \frac{2}{\sigma^2} Re\left[\left(\frac{\partial \mu}{\partial \theta_i}\right)^H \left(\frac{\partial \mu}{\partial \theta_j}\right)\right]$$

Define $\tilde{\theta} = [g_1, g_2, d]^T$. In matrix form, F can be written as $$F = 2\begin{bmatrix} Re(F_c) & -Im(F_c) \\ Im(F_c) & Re(F_c) \end{bmatrix}$$

where each element of $F_c$ is $$F_C(i, j) = \frac{1}{\sigma^2} Re\left[\left(\frac{\partial \mu}{\partial \tilde{\theta}_i}\right)^H \left(\frac{\partial \mu}{\partial \tilde{\theta}_j}\right)\right]$$

Writing $F_c$ in partitioned matrix form, we have $$F_C = \frac{1}{\sigma^2} \begin{bmatrix} A_{11} & A_{12} & A_{13} \\ A_{21} & A_{22} & A_{23} \\ A_{31} & A_{32} & A_{33} \end{bmatrix}.$$

When we let $Q = DW_L$, we can obtain each block of the $F_c$ matrix as $$A_{11} = \frac{\partial \mu^H}{\partial g_1} \frac{\partial \mu}{\partial g_1^H} = [W_L^H D^H \quad 0][DW_L \quad 0]^T = Q^H Q$$

$$A_{12} = \frac{\partial \mu^H}{\partial g_1} \frac{\partial \mu}{\partial g_2^H} = [W_L^H D^H \quad 0][0 \quad DW_L]^T = 0$$

$$A_{13} = \frac{\partial \mu^H}{\partial g_1} \frac{\partial \mu}{\partial d^H} = [W_L^H D^H \quad 0][H_1 \quad 0]^T = Q^H H_1$$

$$A_{21} = \frac{\partial \mu^H}{\partial g_2} \frac{\partial \mu}{\partial g_1^H} = [0 \quad W_L^H D^H][DW_L \quad 0]^T = 0$$

$$A_{22} = \frac{\partial \mu^H}{\partial g_2} \frac{\partial \mu}{\partial g_2^H} = [0 \quad W_L^H D^H][0 \quad DW_L]^T = Q^H Q$$

$$A_{23} = \frac{\partial \mu^H}{\partial g_2} \frac{\partial \mu}{\partial d^H} = [0 \quad W_L^H D^H][0 \quad H_2]^T = Q^H H_2$$

$$A_{31} = \frac{\partial \mu^H}{\partial d} \frac{\partial \mu}{\partial g_1^H} = [H_1^H \quad H_2^H][DW_L \quad 0]^T = H_1^H Q$$

$$A_{32} = \frac{\partial \mu^H}{\partial d} \frac{\partial \mu}{\partial g_2^H} = [H_1^H \quad H_2^H][0 \quad DW_L]^T = H_2^H Q$$

$$A_{33} = \frac{\partial \mu^H}{\partial d} \frac{\partial \mu}{\partial d^H} = [H_1^H \quad H_2^H][H_1 \quad H_2]^T = H_1^H H_1 + H_2^H H_2$$

Therefore, we rewrite this as $$F_c = \frac{1}{\sigma^2} \begin{bmatrix} Q^H Q & 0 & Q^H H_1 \\ 0 & Q^H Q & Q^H H_2 \\ H_1^H Q & H_2^H Q & H_1^H H_1 + H_2^H H_2 \end{bmatrix}$$

Note that matrix $F_c$ is at least rank 1 deficient due to the scalar ambiguity of the channel. To evaluate the CRLB channel estimator, we consider one element of the channel (e.g., the first element of $g_1$) as known. After deleting the column and row associated with the known parameter, the remaining matrix is full rank, so that the CRLB can be evaluated by taking the inverse of that matrix.

It is interesting to consider the situation when $g_1$ and $g_2$ share a common zero at a subcarrier frequency, say $k_0$. In this case, matrix $F_c$ will have an all zero row and column at the corresponding input symbol location, i.e., the row and column corresponding to $d_{k0}$. Therefore, even if we assume that $g_1(1)$ is known, and hence its corresponding row and column is deleted from the FIM, the remaining FIM is still not full rank. One explanation could be that, because of the common zero at a subcarrier frequency, the corresponding symbol $d_{k0}$ is clearly not identifiable. However, it is found numerically that after getting rid of the row and column corresponding to $d_{k0}$, the remaining FIM is still rank deficient, which implies that the channel itself may not be identifiable. This observation suggests that a possible necessary condition for channel identifiability is that $g_1$ and $g_2$ do not share common zeros at subcarrier frequencies. Notice that this condition is weaker than that stated in the sufficient condition where $g_1$ and $g_2$ do not share any common zeros without regard to their possible locations.

We now provide some numerical examples in this section to evaluate the performance of the proposed method and we compare this method to the subspace method disclosed in X. Cai and A. N. Akansu, "A subspace method for blind channel identification in OFDM systems," in Proc. ICC'2000, New Brunswick, N.J., March 2000, vol.2, pp. 929-933. We use the normalized root mean square error (NRMSE) as the performance criterion, which is defined as:

$$NRMSE = \frac{1}{\|g\|} \sqrt{\frac{1}{M_c L} \sum_{m=1}^{M_c} \|\hat{g} - g\|^2}$$

where $M_c$ is the number of Monte Carlo runs, L is the channel length, $\hat{g}$ is the channel estimate, and g is the true channel. We used N=16, L=5, $M_c$=1000 and a 16 QAM modulation scheme which are the same as the ones used by X. Cai and A. N. Akansu. The channel impulse responses are $g_1 = [-0.40-0.17i, \ 0.11+0.06i, \ -0.10+0.12i,$
$\quad 0.66-0.50i, \ -0.24+0.16i]^T$ $g_2 = [-0.16-0.10i, \ 0.52-0.10i, \ 0.14+0.01i,$
$\quad 0.50+0.57i, \ -0.25+0.14i]^T$ \hfill (9)

Figure 3:
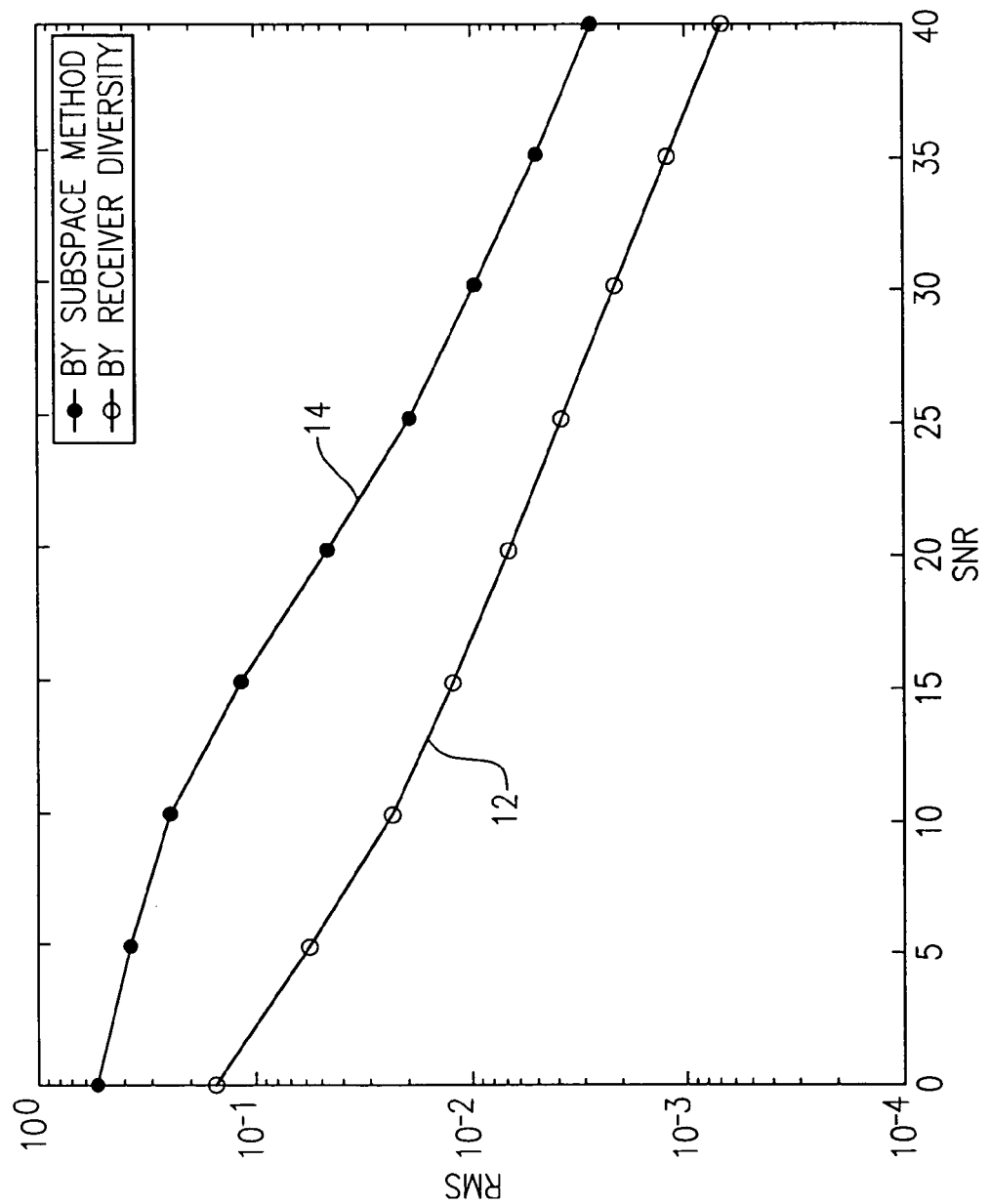
FIG. 3 shows the normalized RMSE for the blind OFDM channel estimation done using the diversity scheme of the present invention compared to the estimation done using the subspace scheme of the prior art method.

Since the subspace method of X. Cai and A. N. Akansu does not require channel diversity, we evaluate the performance of channel estimation for $g_1$, i.e., $g=g_1$ in the NRMSE expression. Because of the scalar ambiguity, we set $\hat{g}(1) = g(1)$ in calculating the NRMSE. The results are plotted in FIG. 3, which shows the normalized RMSE for the blind OFDM channel estimation done using the diversity scheme of the present invention, shown as curve 12, and the subspace scheme of the prior art method shown as curve 14. The channel impulse responses are specified in L. Tong and S. Perreau, "Multi channel blind channel estimation: From subspace to maximum likelihood methods," IEEE Proceedings, 1998, pp. 1951-1968, October 1998 where the NRMSE for channel $g_1$ is used for comparison.

In the simulation, the subspace method of the prior art uses 60 blocks while the diversity method of the invention uses only 30 blocks. Clearly, the diversity based method of the invention performs better than the subspace method of the prior art. The gain also depends on the second channel impulse response $g_2$, although we do find through extensive simulation that in almost all cases, the diversity based channel estimation provides substantial performance gain over the subspace method provided no common zeros exist for the two channels.

Figure 4:
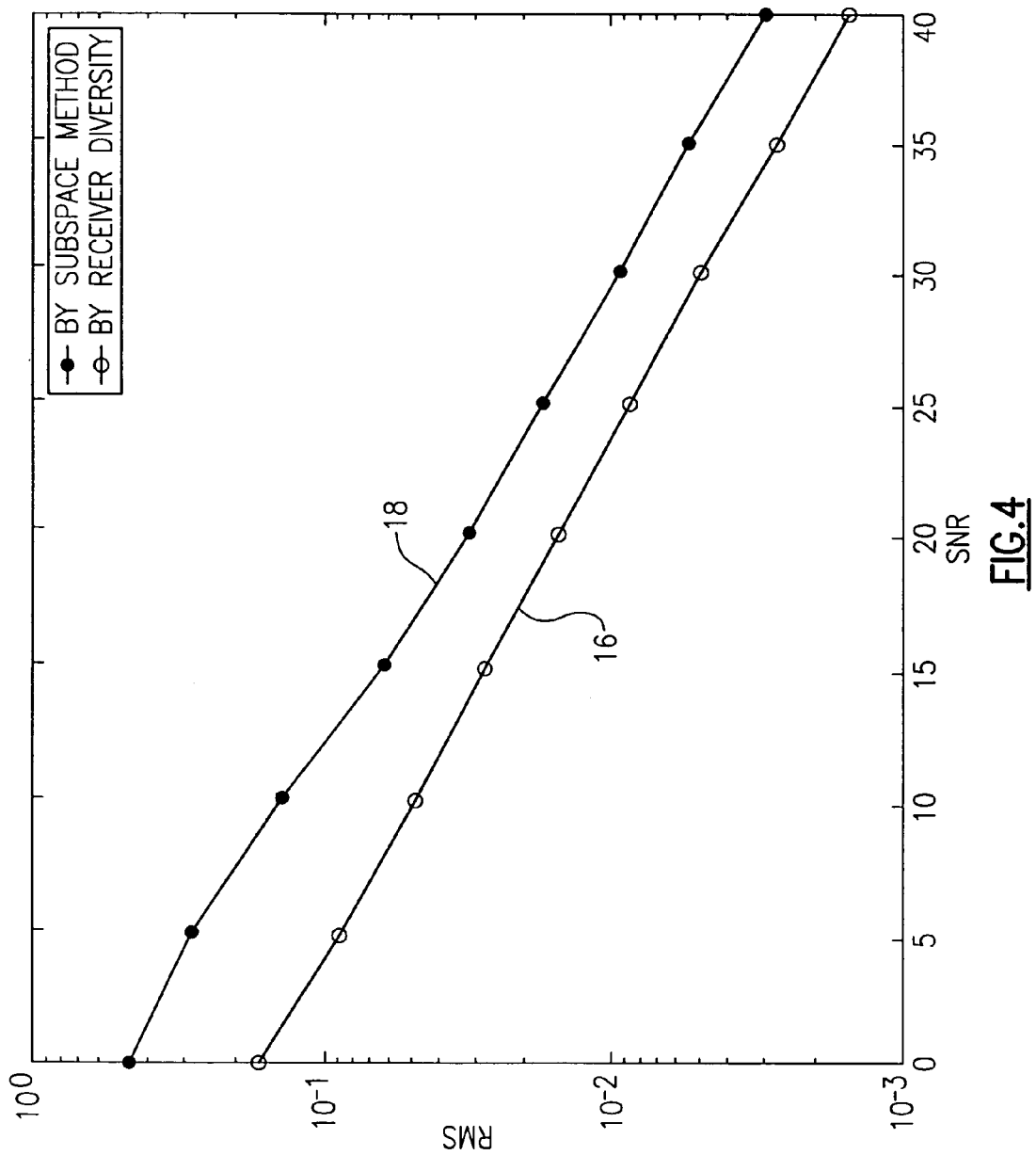
FIG. 4 shows the normalized RMSE for the blind OFDM channel estimation done using the diversity scheme of the present invention compared to the estimation done using the subspace scheme of the prior art method, for the situation where there are certain channel nulls in the channel impulse responses for channels 1 and 2 at some subcarrier frequencies, although they do not share common nulls.

FIG. 4 shows the normalized RMSE for the blind OFDM channel estimation done using the diversity scheme of the present invention, shown as curve 16, and the subspace scheme of the prior art method shown as curve 18, for the situation where there are certain channel nulls for both $g_1$ and $g_2$ at some subcarrier frequencies, although they do not share common nulls. The channel impulse responses are specified in R. Negi and J. Cio, "Pilot tone selection for channel estimation in a mobile OFDM system," IEEE Trans. Consumer Electronics, vol. 44, no.3, pp. 1122-1128, August 1998 where the NRMSE for channel $g_1$ is used for comparison. The channel impulse responses are chosen as $g_1 = [0.47+0.21i, -0.28+0.18i, 0.03+0.10i, 0.77+0.05i, -0.02-0.08i]^T$ $g_2 = [0.38+0.15i, 0.30-0.36i, 0.03+0.22i, 0.67-0.05i, 0.13-0.30i]^T$ (10)

It is easy to verify that $g_1$ has nulls at the 3rd and 9th subcarrier frequencies, while $g_2$ has nulls at the 4th and 7th subcarrier frequencies. Simulation results show that channels nulls do not affect the performance of the diversity based estimator of the present invention, as long as no identical nulls exist for both channels. Indeed, if the two channels have common nulls at a subcarrier, the performance of the diversity method is very poor. This supports the conjecture that no common zero at subcarrier frequency is also a necessary condition for identifiability.

Figure 5:
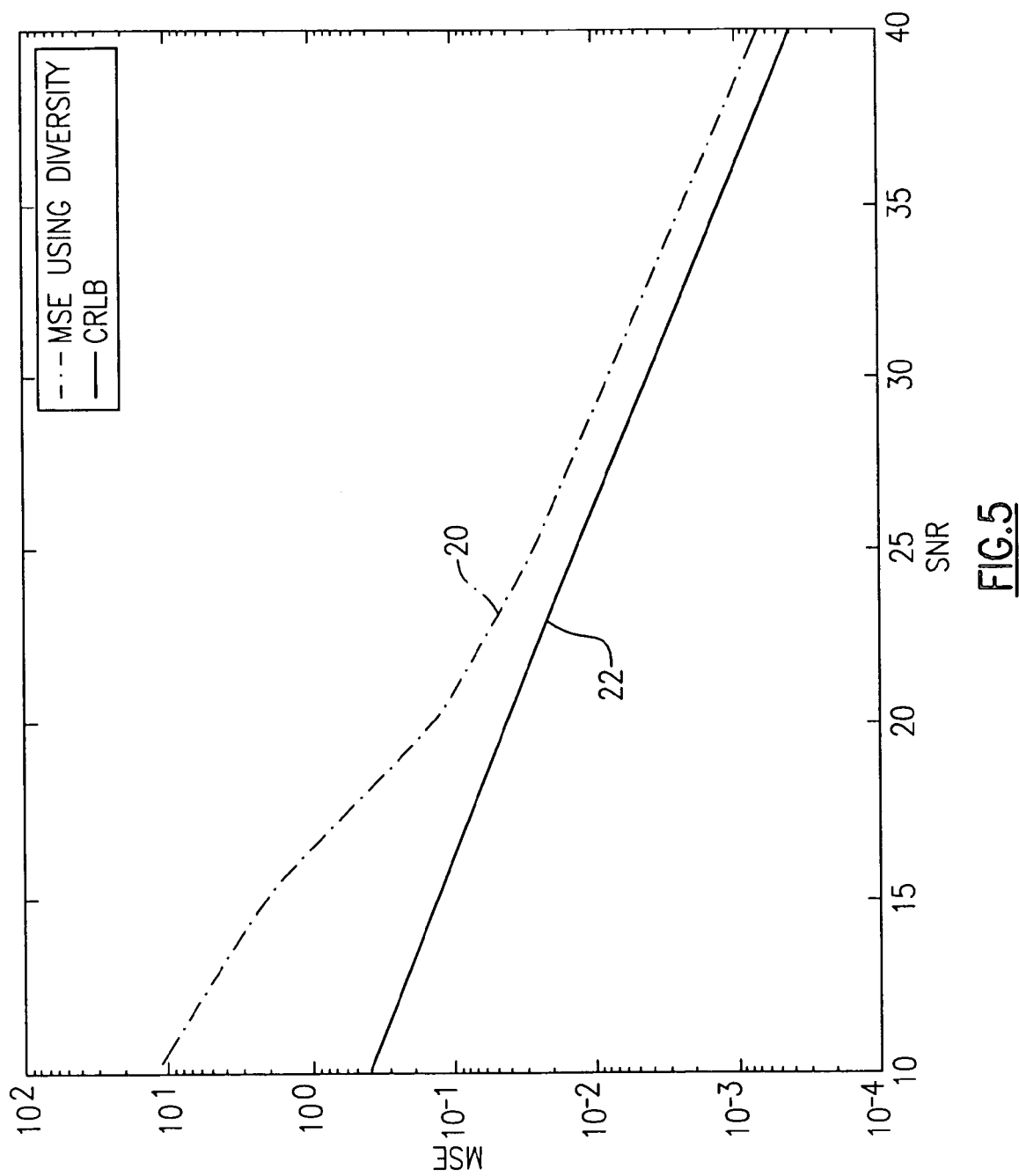
FIG. 5 shows the mean square error (MSE) of the channel estimation done using the diversity method of the present invention along with the Cramer-Rao Lower Bound (CRLB) of the channel estimation done using the same method.

In FIG. 5, we plot the mean square error (MSE) of channel estimation using the diversity method of the present invention, shown as curve 20, along with the CRLB, shown as curve 22. Parameter settings are the same as in L. Tong and S. Perreau. We assume the first element of $g_1$ is known; therefore, the first row and column of the matrix in $F_c$ is deleted so that the corresponding CRLB is numerically evaluated by taking the inverse of the remaining FIM. We compare the MSE and CRLB for $g_2$ and the MSE is obtained as usual:

$$MSE = \frac{1}{M_c} \sum_{m=1}^{M_c} \|\hat{g}_2 - g_2\|^2$$

We use only a single OFDM block in this scenario. It can be seen that the MSE of the proposed method is fairly close to the CRLB.

In summary, N subcarriers are used to modulate information symbols to construct one OFDM symbol. Cyclically extended guard time is inserted to maintain inter-carrier orthogonality in the presence of a time-dispersive channel. Assuming two receive antennas are used, the received signals, after timing and carrier frequency synchronization and application of DFT, can be written as $y_1 = H_1 + z_1$ $y_2 = H_2 + z_2$ where $H_i = \text{diag}(h_i)$ with $h_i = [H_i(0), \ldots, H_i(N-1)]^T$, $H_i(k)$ is the channel frequency response corresponding to $i^{th}$ channel at subcarrier k, $d = [d_0, \ldots, d_{N-1}]^T$ is the symbol vector, and $z_1$ and $z_2$ are additive white complex Gaussian noises which are uncorrelated with each other. Using simple matrix algebra, we rewrite the signal model as $y_1 = Dh_1 + z_1 = DW_L g_1 + z_1$ $y_2 = Dh_2 + z_2 = DW_L g_2 + z_2$ where $D = \text{diag}(d)$, and $g_i$ is the impulse response for the $i^{th}$ channel and is of length L.

We now study the extension of the method to the case when virtual carriers are present and provide some important identifiability results. In addition to being data efficient, the proposed method is independent of the input symbol constellation, computationally efficient, and superior in performance compared with most existing blind algorithms.

In practice, virtual carriers, i.e., those subcarriers that are not used to modulate input symbols, are often inserted for anti-aliasing after D/A conversion. The results in the previous embodiment of the invention are derived using the assumption that no virtual carriers are present. In this embodiment, we extend the results including the identifiability condition to the case with virtual carriers. In the following, we assume that M out of N (where N>M) subcarriers are used to modulate the information symbols, and we assume, without loss of generality, that the virtual carriers correspond to the last N−M subcarriers.

The method of the previous embodiment can be modified to adapt to the presence of virtual carriers. Redefining the observation vectors $y_1$ and $y_2$ by excluding those virtual carrier components, i.e., $y_i = [y_i(0), \ldots, y_i(M-1)]^T$ for i=1,2 and constructing $Y_i = \text{diag}(y_i)$, we can verify that virtually the same method can be applied here. We obtained a similar set of identifiability conditions.

Theorem 3 (sufficient condition): The channel impulse responses $g_1$ and $g_2$ can be identified up to a scalar factor if the following conditions hold:

1. $H_1(z)$ and $H_2(z)$ do not share common zeros.
2. $M \geq 2L-1$

Proof: In the noiseless case, equation (4) yields $y_1(k) = d_k \cdot u_k^H g_1$ $y_2(k) = d_k \cdot u_k^H g_2$ Assuming that we have another set of channel responses $\tilde{g}_1$ and $\tilde{g}_2$ that also satisfy the same system model, then we have $d_k \cdot u_k^H g_1 = \tilde{d}_k \cdot u_k^H \tilde{g}_1$ $d_k \cdot u_k^H g_2 = \tilde{d}_k \cdot u_k^H \tilde{g}_2$ (11)

From this we get, through cross multiplication, $d_k \tilde{d}_k (u_k^H g_1)(u_k^H \tilde{g}_2) = d_k \tilde{d}_k (u_k^H g_2)(u_k^H \tilde{g}_1)$ Consider the non-virtual carriers only, i.e., for k such that $d_k \neq 0$. If $\tilde{d}_k = 0$, then from equation (11), $g_1$ and $g_2$ must share a common zero. Thus $\tilde{d}_k \neq 0$ for virtual carriers, and we have $H_1(k)\tilde{H}_2(k) = \tilde{H}_1(k)H_2(k)$ for k=0, ..., M−1. Notice that $\tilde{H}_i(k)$ and $\tilde{H}_i(k)$ are respectively Z transform sampled at frequency $2\pi k/N$ for impulse response $g_i$ and $\tilde{g}_i$. This is equivalent to, for $z = e^{-j2\pi k/N}$, $$\left[\sum_{n=1}^{L-1} g_1(n)z^{-n}\right]\left[\sum_{n=1}^{L-1} \tilde{g}_2(n)z^{-n}\right] = \left[\sum_{n=1}^{L-1} g_2(n)z^{-n}\right]\left[\sum_{n=1}^{L-1} \tilde{g}_1(n)z^{-n}\right]$$

Expanding the products on both sides, we obtain $$\beta_0+\beta_1 z^{-1}+\beta_{2L-1} z^{-2(L-1)}|_{z=e^{-2jk n/N}}=0$$

for k=0, ..., M−1 where $$\beta_i = \left[\sum_{n=0}^{i} g_1(n)\tilde{g}_2(i-n)\right]\left[\sum_{n=0}^{i} g_2(n)\tilde{g}_1(i-n)\right]$$

In matrix form, we write this as $$Z_M \beta = 0$$

The rows of $Z_M$ are the corresponding M rows of $W_{2L-1}$, where $W_{2L-1}$ is the first 2 L−1 columns of DFT matrix W, and $\beta=[\beta_0, \beta_1, \ldots, \beta_{2L-1}]^T$. If $M \geq 2$ L−1, then the van der Monde matrix $Z_M$ is full column rank. Therefore $$\beta = 0 \Longrightarrow \sum_{n=0}^{i} g_1(n)\tilde{g}_2(i-n) = \sum_{n=0}^{i} g_2(n)\tilde{g}_1(i-n)$$

The left and right hand sides of the above equation correspond to the linear convolution between $g_1$ and $g_2'$, $g_2$ and $g_1'$, respectively. Thus we have $H_1(z)\tilde{H}_2(z)=\tilde{H}_1(z) H_2(z)$. Therefore, $\Re(H_1(z)) \in \Re((\tilde{H}_1(z)) \cup \Re((H_2(z))$ is the set of roots $H_1(z)$. Since the channels do not share any common zero, we must have $$\Re(H_1(z)) \in \Re(\tilde{H}_1(z)). \tag{12}$$

Since $g_1$ and $\tilde{g}_1$ are of the same length, their corresponding z-transforms have the same number of roots. Combined with equation (12), we have $$H_1(z)=\alpha \tilde{H}_1(z) \Rightarrow g_1 = \alpha \tilde{g}_1$$

Similarly, we can get $g_2=\tilde{g}_2$. Q.E.D.

Theorem 4 (necessary condition): If the channel impulse responses 1 and 2 are identifiable up to a scalar factor, then $M \geq 2$ L−1. The proof is similar to that of Theorem 2, so the details are omitted.

We now carry out the performance evaluation of the proposed algorithm both analytically (i.e., with the CRLB) and numerically. We use 16 subcarriers with a channel length equal to 5. Randomly generated 16-QAM symbols are used as input symbols.

In the previous embodiment, we obtained the CRLB for the channel estimation using diversity scheme. In particular, the FIM corresponding to the complex vectors $g_1$, $g_2$ and d is obtained as $$F_c = \frac{1}{\sigma^2}\begin{bmatrix} Q^H Q & 0 & Q^H H_1 \\ 0 & Q^H Q & Q^H H_2 \\ H_1^H Q & H_2^H Q & H_1^H H_1 + H_2^H H_2 \end{bmatrix}$$

where $Q=DW_L$. Because of the scalar ambiguity, $F_c$ is at least rank one deficient. The CRLB can be computed by striking out one row and column (assuming the corresponding element is known) of $F_c$ and taking the inverse of the remaining matrix. In the presence of virtual carriers, we can simply verify that the corresponding FIM is similar to $F_c$ but with the exception that that all the rows and columns corresponding to virtual carriers are excluded.

Figure 6:
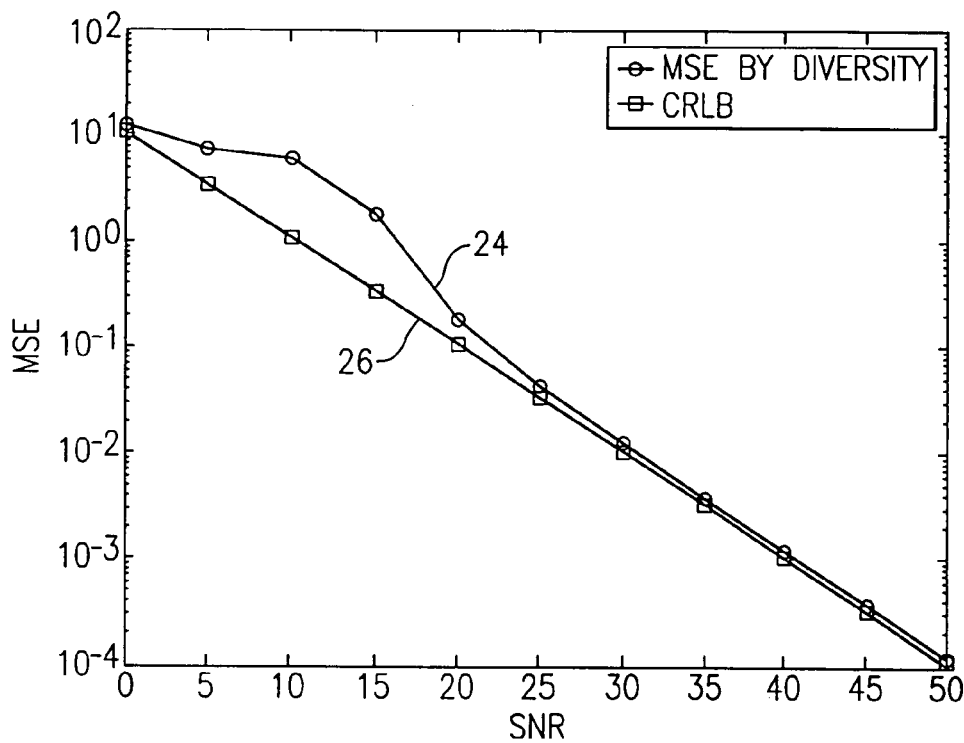
FIG. 6 shows the mean square error (MSE) for the blind channel estimation done using the diversity method of an embodiment of the present invention along with the corresponding CRLB.

Referring to FIG. 6, we compare the mean squared error (MSE) (shown as curve 24) of this second embodiment in the presence of virtual carriers to the corresponding CRLB (shown as curve 26), using the following channel pair:

$g_1$=[−0.21−0.35i, −0.37+0.53i, −0.10+0.03i, 0.01+0.62i, 0.09−0.12i$]^T$ $g_2$=[0.29−31i, −06−63i, 0.17+0.07i, −03+0.60i, −03+0.10i$]^T$

The last three carriers are chosen as virtual carriers. Furthermore, we assume that $g_1(0)$ is known to eliminate the scalar ambiguity and we compute the CRLB for $g_2$. The proposed method is almost efficient for large SNR.

Figure 7:
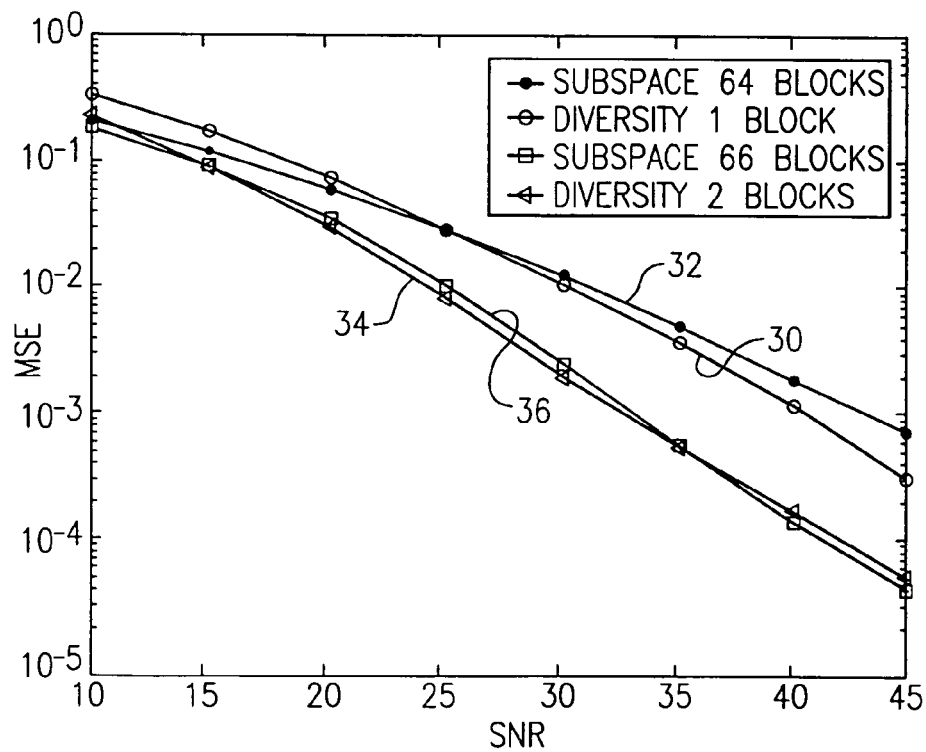
FIG. 7 shows the MSE for the blind channel estimation done using the diversity method of an embodiment of the present invention compared to the channel estimation done using the subspace scheme of the prior art method.

Referring to FIG. 7, we compare the MSE performance of the method of the second embodiment to the subspace method referred to previously. Since the subspace method does not work for the virtual carrier present case, we only consider the no virtual carrier present case. The scalar ambiguity is then eliminated using a different approach. Assume that the channel estimation algorithm yields an estimate for $g_1$ as $\tilde{g}_1$. Defining $\alpha=\tilde{g}_1^H g_1/|\tilde{g}_1|^2$, we use $\hat{g}_1=\alpha\tilde{g}_1$ as the channel estimate. The reason is that in the simulation we average the performance over 200 randomly generated channels. The approach of assuming a known channel coefficient may occasionally lead to trouble for any blind channel estimation algorithm if the coefficient happens to be of a very small magnitude.

The result is shown in FIG. 7 where 1000 Monte Carlo runs are used. The diversity scheme of the second embodiment using only one block is shown as curve 30, while the subspace scheme using 64 blocks is shown as curve 32. Clearly, the diversity based scheme needs only one OFDM data block to obtain performance equivalent to the subspace method using 64 blocks. Thus the new approach is much more appealing for high mobility applications. The diversity scheme using 2 blocks is shown as curve 34, while the subspace scheme using 66 blocks is shown as curve 36.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for blindly determining a channel impulse response for a channel in an orthogonal frequency division multiplexing (OFDM) communications system, said method comprising the steps of:

providing at least first and second receive antennas which produce at least first and second OFDM received signals from a single OFDM signal transmitted over said channel; and processing said first received signal and said second received signal to determine said channel impulse response for said channel, thereby permitting recovery of said signal transmitted OFDM signal;

wherein said step of processing includes the additional steps of:

constructing a constructed matrix from said at least first and second received signals; performing a singular value decomposition on said constructed matrix to produce a left singular matrix and a right singular matrix;

finding a right singular vector corresponding to a smallest singular value of said constructed matrix, thereby yielding said channel impulse response multiplied by an unknown scalar constant; and removing said unknown scalar constant, thereby yielding said channel impulse response and permitting recovery of the single transmitted OFDM signal by siad communications system, including information contained in said signal for use by said system.

2. A machine used within an orthogonal frequency division multiplexing (OFDM) communications system, said machine having a program storage device, said program storage device tangibly embodying a program of instructions executed by said machine program of instructions causing the machine to receive at least first and second OFDM received signals from a single OFDM signal transmitted over said channel of said communications system, said at least first and second OFDM received signals being produced from at least first and second receive antennas, respectively; and process said first redeived signal and said second received signal to determine a channel impulse response for said single channel, thereby permitting recovery of said single transmitted OFDM signal;

wherein said program storage device further instructs said machine to process the first and second received signals so as to construct a constructed matrix from said at least first and second received signals;

perform a singular value decomposition on said constructed matrix to produce a left singular matrix and a right singular matrix;

find a right singular vector corresponding to a smallest singular value of said constructed matrix, thereby yielding said channel impulse response multiplied by an unknown scalar constant; and remove said unknown scalar constant, thereby yielding said channel impulse response wherein said estimated impulse response is Then transmitted as output to the system, which retrieves the information contained therein for use by said system.

3. A system for blindly determining a channel impulse response for a channel in an orthogonal frequency division multiplexing (OFDM) communications system, comprising:

means for providing at least first and second receive antennas that produce at least first and second OFDM received signals from a single OFDM signal from a single transmit antenna transmitted over said channel; and means for jointly processing said first received signal and said second received signal to determine said channel impulse response for said channel, thereby permitting recovery of said single transmitted OFDM signal), wherein said means for jointly processing:

constructs a constructed matrix from said at least first and second received signals;

performs a singular value decomposition on said constructed matrix to produce a left singular matrix and a right singular matrix:

finds a right singular vector corresponding to a smallest singular value of said constructed matrix, thereby yielding said channel impulse response multiplied by an unknown scalar constant; and removes said unknown scalar constant, thereby yielding said channel impulse response.

* * * * *